Aug. 12, 1969  P. L. PIERCY  3,460,864
COLLAPSIBLE TRUCK RACK
Filed April 11, 1967  2 Sheets-Sheet 1
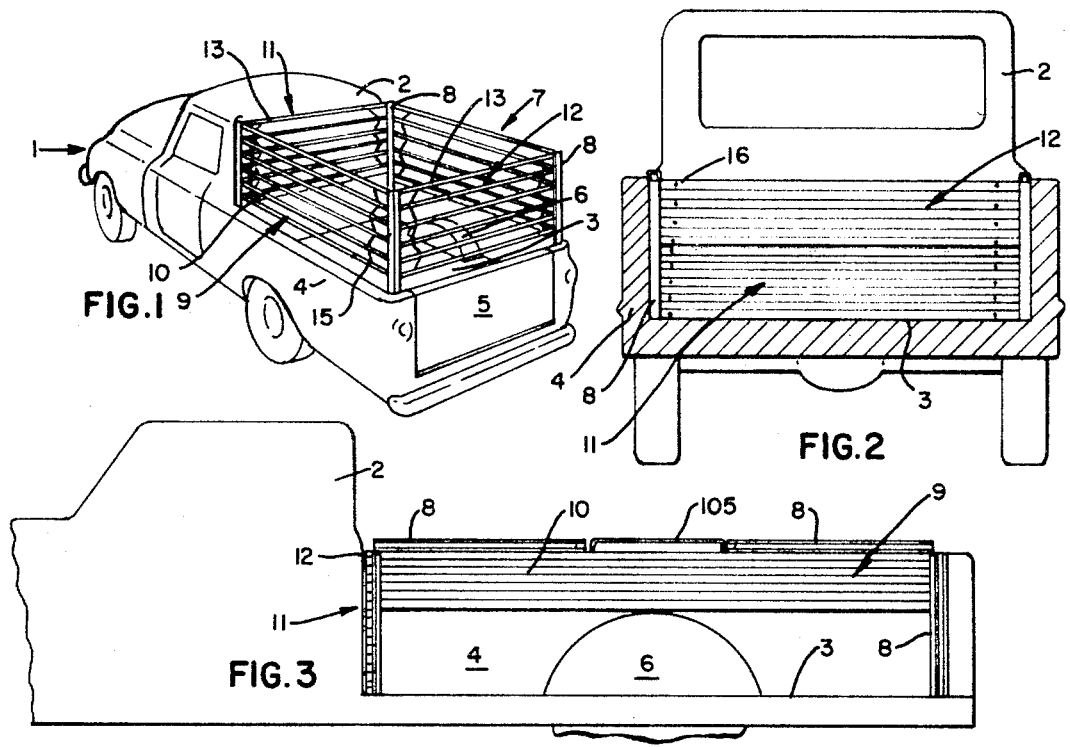
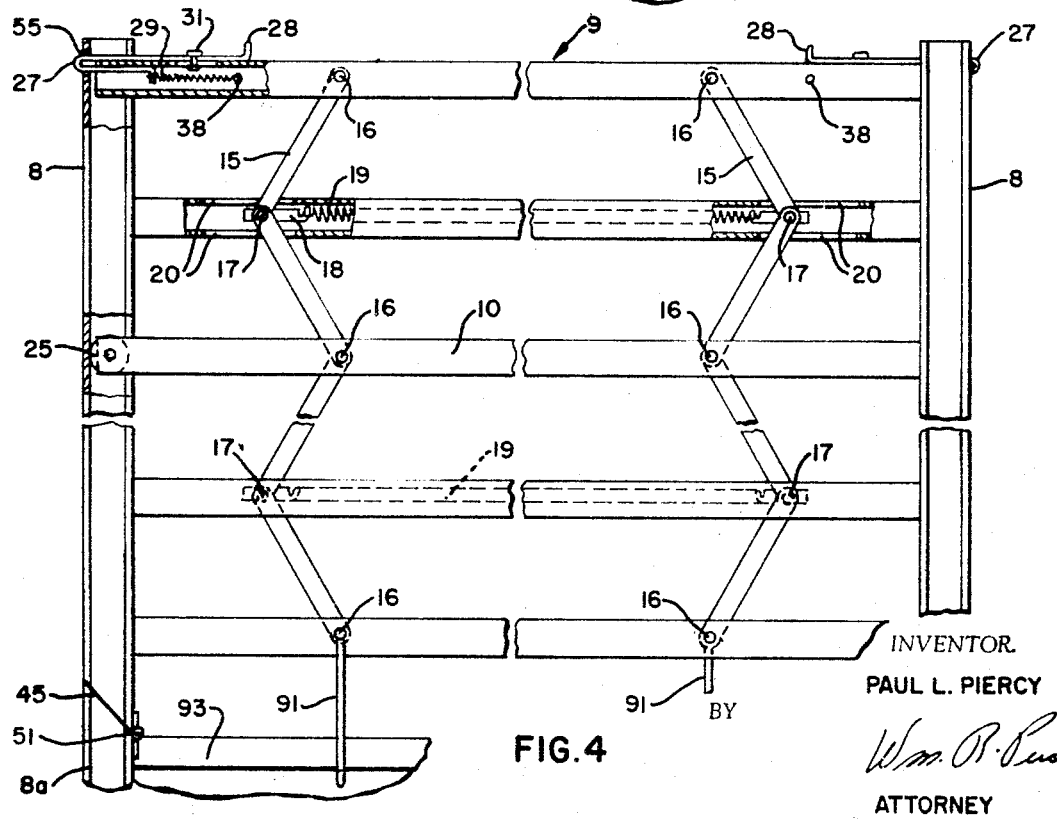
INVENTOR.
PAUL L. PIERCY
BY
ATTORNEY Aug. 12, 1969  P. L. PIERCY  3,460,864
COLLAPSIBLE TRUCK RACK
Filed April 11, 1967  2 Sheets-Sheet 2
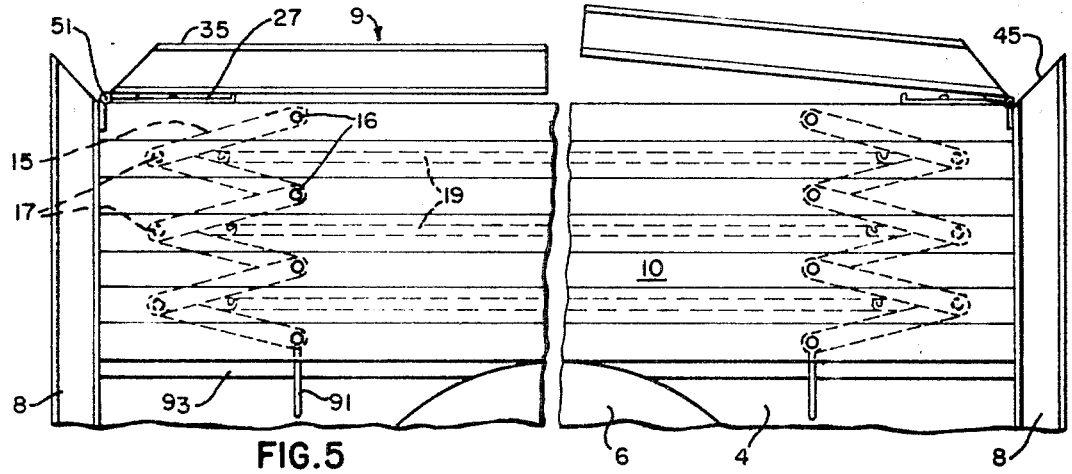
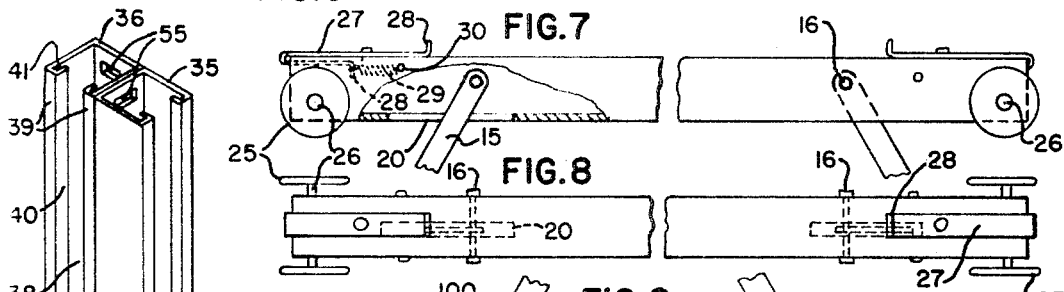
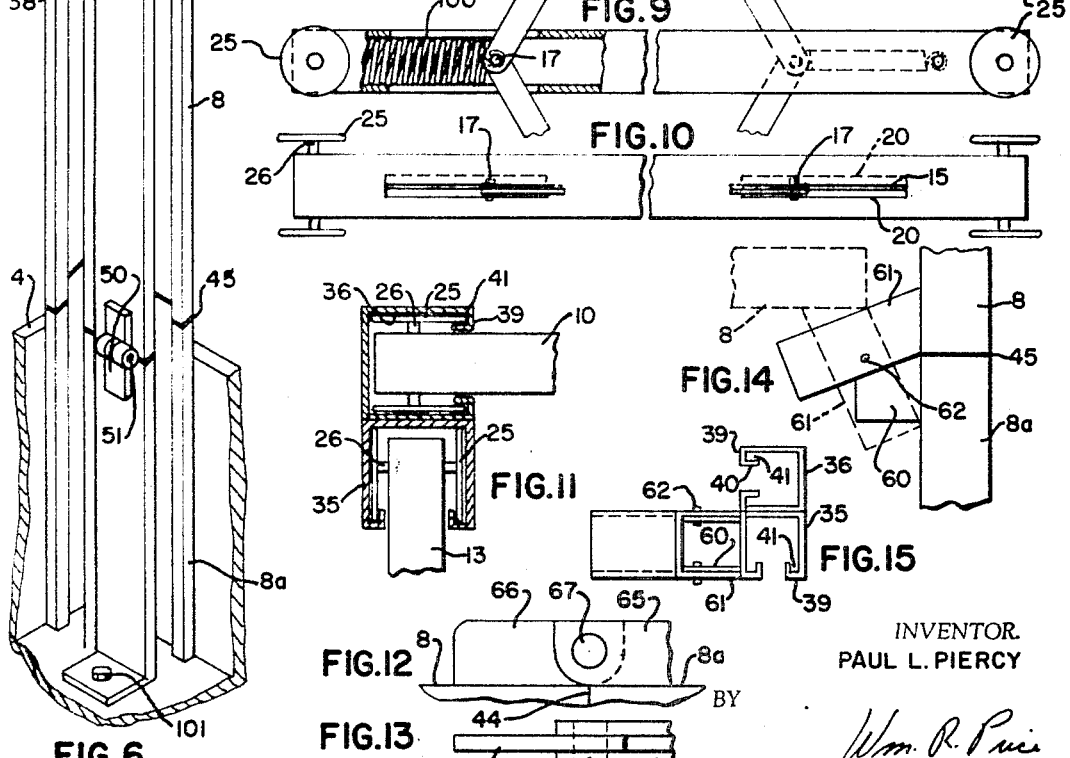
INVENTOR.
PAUL L. PIERCY
BY
Wm. R. Price
ATTORNEY 3,460,864
Patented Aug. 12, 1969

3,460,864
COLLAPSIBLE TRUCK RACK
Paul L. Piercy, Louisville, Ky., assignor to Pierco, Incorporated, Louisville, Ky., a corporation of Kentucky
Filed Apr. 11, 1967, Ser. No. 629,994
Int. Cl. B60p 1/02
U.S. Cl. 296—3                                  9 Claims

ABSTRACT OF THE DISCLOSURE

Discloses a collapsible truck rack including: a series of sets of parallel bars, connected together by a parallel motion mechanism in the form of pivotable links and mounted in a series of vertical posts which are hinged so that in collapsed condition the posts fold longitudinally over the collapsed set of parallel bars.

FIELD OF THE INVENTION

This invention relates to a collapsible truck rack which is permanently mounted in the bed of a truck. More specifically, this invention relates to a track rack especially designed for pickup trucks and the like which when not in use, can be collapsed so that it is not visible to the casual observer and is stored behind the walls of the truck bed.

DESCRIPTION OF THE PRIOR ART

Truck racks have been for the most part homemade racks consisting of a series of permanent posts and permanent bars or boards preferably made of oak or other strong hardwood which when in use, fit into the sockets provided in the truck bed. When not in use, the rack portions would be removed from the sockets and placed in a storage spot. Because of the necessity of providing strength for hauling animals, etc., a rack portion is of considerable weight which normally necessitates two men to lift it on and off of the truck and into position onto the truck bed. Furthermore, unless suitable storage facilities are available, the rack portions are exposed to the weather and to injury.

Proposals have been made in the past to provide a permanently arranged rack having hinged posts which could either be folded inwardly to reduce the size of the rack by disposing the inner portion of the rack inside the truck bed such as is disclosed in U.S. Patent No. 2,224,126, or folded outwardly to provide a lateral platform such as is disclosed in U.S. Patent No. 2,856,225. In any event, the rack was still visible and was not completely stored away.

SUMMARY

According to my invention there is provided a rack comprising parallel bars which are slidably positioned in vertical support posts permanently installed onto the truck bed. The rack is comprised of several sets of parallel bars in which each set contains a plurality of parallel bars interconnected with a parallel motion mechanism for facilitating the vertical positioning of the rack sets between extended and collapsed positions.

The vertical support and guide posts provide a guiding means for vertically positioning the set of parallel bars and in collapsed position provide a storage space for the set of parallel bars inside of the wall of the bed of the truck.

Additionally, the vertical support and guide posts are hinged so as to fold longitudinally relative to the truck bed over the collapsed set of parallel bars to protect same. The front vertical support and guide posts provide additionally storage space for the rear set of parallel bars when in collapsed position.

BRIEF DESCRIPTION OF THE DRAWING

FIG. 1 is a view in perspective of the rack of my invention in extended position, and installed on a truck.

FIG. 2 is an end elevational view illustrating the rack in collapsed position and illustrating the storage for the end set of parallel bars forming the rear end of the rack.

FIG. 3 is a fragmentary sectional view of the rack in collapsed position illustrating its relation to the bed of a truck.

FIG. 4 is a side elevational view partially in section, illustrating the rack in extended position.

FIG. 5 is a side elevational view illustrating the rack in collapsed position.

FIG. 6 is a perspective view of the vertical guide and support post of my invention, illustrating its relation to the truck bed when mounted either as the left front or right rear post.

FIG. 7 is a fragmentary side elevational view, partially in section, of the top longitudinal parallel bar forming part of the rack.

FIG. 8 is a top plan view of the bar illustrated in FIG. 7.

FIG. 9 is a side elevation, partially in section, of an even numbered longitudinal parallel bar, forming part of the rack.

FIG. 10 is a plan view of the bar illustrated in FIG. 9.

FIG. 11 is a sectional view illustrating the guiding means between the vertical support and guide posts and the longitudinal parallel bars.

FIG. 12 is a fragmentary side elevational view illustrating a modification of a hinge.

FIG. 13 is a plan view of the modification of the hinge shown in FIG. 12.

FIG. 14 is a fragmentary side elevational view of a modification of a hinge.

FIG. 15 is a plan view partially illustrating the modification shown in FIG. 14.

DESCRIPTION OF THE PREFERRED EMBODIMENT

Referring now to the drawings in detail, the entire rack is shown in extended position in FIG. 1 mounted on truck 1 having a cab 2, a bed 3, and sidewalls 4. The tailgate 5 is shown in normal closed position. Inside of the bed of the truck is shown the fender 6 and the rack 7 installed therein. The rack itself consists of four posts 8 containing an upper portion and a bottom portion 8a. Extending between the posts 8 is a side set 9 of parallel bars consisting of a series of parallel longitudinal bars 10. The front end set of parallel longitudinal bars is designated by numeral 11, and the rear end set of parallel longitudinal bars is designated by numeral 12. The bars themselves forming both the front and rear end sets are designated by numeral 13.

As is best shown in FIG. 4 there is interposed between each of the longitudinal bars 10 a parallel motion mechanism consisting of a series of links 15 which are pivoted to the top, bottom and odd-numbered parallel bars at a pivot point 16, which is fixed relative to horizontal movement. The links 15 are pivoted at their other end to the end of an upper or lower link 15 at a mobile pivot point 17.

There is provided a longitudinal slot 20 in the lower surface of the upper parallel longitudinal bar 10 and the upper surface of the lower longitudinal parallel bar 10 and in both upper and lower surfaces of the intermediate longitudinal parallel bars 10. As shown in FIG. 10, the upper slot is offset from the lower slot. The links 15 fit into or through the slot 20 so that the mobile pivot point 17 is located internally of the hollow longitudinal parallel bar 10 in the even-numbered bars while the pivot pin 16 extends completely through the odd-numbered longitudinal parallel bars 10. Connected to the links 15 at the mobile pivot point 17 in the modification shown in FIG. 4 is an arm containing a hook 18 to which is connected a spring 19 to place tension on the mobile pivot point 17 thus urging it into extended position against the weight of the parallel bars 10.

In the modifications shown in FIGS. 9 and 10, a compression spring 100 is used to force the mobile joint 17 medially and thus raises the rack section 9 into extended position against the weight of the parallel bars 10.

At either end of the longitudinal bars 10 is located a pair of rollers 25 which are journalled onto pin 26 extending transversely through the bar 10. Additionally, there is also located at the ends of the top bar 10 a U-shaped latching rod 27 which is bent at each end into an L to form a handle 28. Attached to handle 28 on the inside of bar 10 is spring 29 anchored at point 30 for pulling the latching rod 27 into retracted position.

Referring now more specifically to FIG. 6, the post member 8 consists of two channel members 35 and 36 which are welded together so that the channel opening 37 for channel member 35 is disposed at 90 degrees from channel opening 38 for channel member 36. Each of the channel members is bent inwardly to form a flange or lip 39, and this flange is turned in to form a flange or lip 40 extending toward the rear of the channel member. This forms a space 41 between the lip 40 and the wall of the channel member for provision of the rollers 25 located on either end of the parallel longitudinal bars 10 and 13. It will be also noted that at the top of the post 8 there is located a slot 55. The slot 55 acts as a detent means for the end of latching rods 27 when placed in extended position.

As is best illustrated in FIGS. 4 and 5, an elongated L-shaped hook 91 is attached to the pin 16 on the lowermost bar 10 to depend therefrom so that when the set 9 is in extended position, the hook 91 engages lip 93 of the wall 4 of the truck bed and thus limits the vertical movement of the lowermost bar. This effectively prevents a hog from rooting the lower bar up past a desired point. In collapsed position, the hook 91 merely hanks out of engagement with lip 93.

The lower portion 8a of post 8 is permanently secured to the wall 4 and floor 3 of the truck bed either by welding or by bolts 101. At the point of severance 45 between the post 8 and the bottom 8a is located a hinge 50 containing a pin 51 which allows the post to be folded over the top of the collapsed parallel bars 10, as is best shown in FIGS. 3 and 5.

The rack side sections 9 when in collapsed position rest so that the bottom bar rides on the top of fender 6 and so that the top bar is on a level with the sidewall 4 of the truck bed. The post 8 folds over the top so that the channel opening 38 completely covers the top parallel longitudinal bar 10 and abuts against handle 105 to protect from the weather and from dirt and debris.

The front end set of parallel bars 11 slides to the bottom 3 of the bed of the truck in collapsed position leaving a space between its upper bar and the side of the truck wall 4 for provision of the end section 12 of longitudinal parallel bars. This is best shown in FIG. 2.

In the modified hinge shown in FIGS. 12 and 13, the interior plate 66 is welded to the upper portion of post 8 and the exterior plates 65 are welded to the lower portion of post 8a so that the plates are superimposed at point 45 to form a socket for the provision of pin 67.

In the modified hinge shown in FIGS. 14 and 15, an interior box-like member 60 is welded to lower post portion 8a in vertical alignment therewith. An exterior box-like member 61 is welded to upper post portion 8 so as to depend obliquely therefrom and is pivoted to member 60 by pins 62. In folded position, the member 61 (shown in broken lines), acts as a brace against lower post portion 8a.

OPERATION

The posts 8 are installed in either corner of the truck bed 3 by bolting or welding to the walls of the bed 4 at the front and rear corners.

The sections or sets of parallel bars 9 forming the sides are slideably positioned into the channel openings 38 so that the rollers 25 ride in the space 41 formed by the inturned flange 40 and the sidewall of the channel member. The front set of parallel bars 11 are fitted in similar fashion into the channel opening 37 of channel member 35, and the rear set of parallel bars 12 are fitted into the corresponding channel member at the rear post 8. The latching rod 27 is extended by pushing the L-shaped handle 28 so that the rod 27 fits into hole 55 at the top of each of the posts 8.

To place the rack into collapsed position the latch members are merely pulled back so that the weight of the parallel bars 10 forces the bars downwardly until the bottom parallel bar 10 rests on top of the fender 6. The front set of parallel bars 11 is released and allowed to slide to the bottom 3 or floor of the truck bed. The posts are then pulled over so that the top of the front and rear posts lie in abutting relationship with the handle 105. The rear section 12 is then placed in the open channel portion 37 of channel member 35 and allowed to slide down to rest on top of the set 11.

By provision of the springs 19 or 100 in each of the even-numbered parallel bars, tension is placed on the mobile pivot point 17 to tend to pull or push the links into extended position. Thus, when it is desired to place the rack into extended position, it is only necessary to pull the posts 8 into vertical position and place minimum pressure on handle 105 to place them into position and latch the top bar into position through latching rods 27 and holes 55. As previously indicated, hook 91 engages with lip 93 of the wall 4 of the truck bed to prevent the lower bar from rising past a desired point.

The folded over post portions 8 extending over the top of the collapsed parallel bars tend to prevent rain, manure, and debris from getting into the slots 20 and thus maintain the pivot points in smooth operational condition.

I claim:

1. A collapsible truck rack, formed in a plurality of sets and adapted to be installed onto the bed of a truck, comprising:
  (A) a plurality of sets, in which each set comprises
    (1) a set of at least two longitudinal parallel bars;
    (2) parallel motion mechanism between said bars to compel the upper bars to move along vertical lines relatively to the lower bar when operated between the extended and collapsed positions;
  (B) vertical support and guide posts in which:
    (1) each of said support and guide posts contain guiding means for the ends of two sets of said longitudinal parallel bars,
    (2) each of said support and guide posts act to join two sets together in a continuous whole, and (3) each corner vertical support and guide post is hinged at a point from the bottom at least equal in height to the height of a set of said longitudinal parallel bars when in collapsed position, and which fold over the set of longitudinal bars when in collapsed position, along the longitudinal axis of said parallel bars; and, (C) means for mounting said posts onto the bed of a truck.

2. A collapsible truck rack, as defined in claim 1, in which:
(A) each of said support and guide posts is severed to form a lower portion and an upper portion;
(B) the further combination therewith of a hinge pivotably joining said upper portion and lower portion together, which comprises:
(1) an interior plate welded to one portion of said post,
(2) two exterior plates welded to the other portion of said post,
(3) said interior and exterior plates converging to form a socket at the point of severance of said post,
(4) a pin fitted through said socket.

3. A collapsible truck rack, as defined in claim 1, in which:
(A) each of said support and guide posts is severed to form a lower post portion and an upper post portion;
(B) the further combination therewith of a first member secured to the outer portion of the lower post portion in vertical alignment therewith, and
(C) a second member mounted to said upper post portion and depending obliquely therefrom,
(D) a pin pivotably connecting said first and second members together to form a pivot point;
(E) said second member forming a brace against said lower post portion when the upper post portion is folded so as to lie at 90° relative to the lower post portion.

4. A collapsible truck rack, as defined in claim 1, in which:
(A) each of the corner posts comprise two channel members;
(1) the open portion of the first channel member being disposed at 90° of the second channel member so that the first channel member receives the ends of the set of bars forming the side portion of the rack and the second channel member receives the ends of the set of bars forming the end portion of the rack;
(B) said corner post is severed through both channel members at a point from the bottom equal in height to the height of a set of said longitudinal parallel bars in collapsed position;
(C) the further combination therewith of a hinge connected to said second channel member at the point of severance;
(D) the vertical posts folding over the set of bars when in collapsed position so that the first channel member fits over the top bar of the set forming the side portion of the rack to protect same.

5. A collapsible truck rack, as defined in claim 4, in which:
(A) the second channel member of the front vertical post forms a receiving member for the ends of the set bars forming the rear end of the rack while the rack is not in use.

6. A collapsible truck rack formed in a plurality of sets and adapted to be installed onto the bed of a truck comprising:
(A) a plurality of sets in which each set comprises:
(1) a set of at least two longitudinal parallel bars;
(2) parallel motion mechanism between said bars to compel the upper bars to move along vertical lines relatively to the lower bar when operated between extending and collapsed positions and which include:
(a) a plurality of successive pairs of links in which each link of successive pairs of links is:
(1) pivotally mounted at one end to a bar of said set at a fixed point relative to horizontal movement, and,
(2) pivotally mounted to the other link of the pair at a mobile point relative to vertical and horizontal movement, and
(b) the combination therewith of a spring in relation with said pair of links at its mobile point so as to apply pressure for movement of said mobile point vertically and horizontally; and
(B) vertical support and guide posts in which:
(1) each said support and guide posts contain guiding means for the ends of two sets of said longitudinal parallel bars,
(2) each of said support and guide posts act to join two sets together into a continuous whole; and
(C) means for mounting said posts onto the bed of a truck.

7. A collapsible truck rack, as defined in claim 6, in which:
(A) each of said sets contains more than two longitudinal parallel bars;
(B) said longitudinal parallel bars are hollow and contain slots on their upper and lower surfaces;
(C) said plurality of successive pairs of links are pivotably mounted at each of said fixed points to an odd-numbered parallel bar,
(1) said link extending through said slots so that the fixed point is inside said bar;
(D) said links being mounted at each of said mobile points in bars of even numbers;
(1) said links extending through said slots so that the said mobile point is inside said even-numbered bar;
(E) said spring being mounted inside said even bar and connected to said mobile point to facilitate vertical and horizontal movement.

8. A collapsible truck rack, as defined in claim 7, in which:
(A) the slot on the upper surface of said parallel bar is offset relative to the slot on the lower surface of said parallel bar, so that the pivot point formed inside of said bar is out of registry with both said upper and lower slots.

9. A collapsible truck rack formed in a plurality of sets and adapted to be installed onto the bed of a truck comprising:
(A) a plurality of sets in which each set comprises:
(1) a set of at least two longitudinal parallel bars;
(2) parallel motion mechanism between said bars to compel the upper bars to move along vertical lines relatively to the lower bar when operated between extended and collapsed positions;
(B) vertical support and guide posts in which:
(1) each of said support and guide posts contain guiding means for the ends of two sets of longitudinal parallel bars;

(2) each of said support and guide posts act to join two sets together into a continuous whole; and
(C) means for mounting said posts onto the bed of a truck; and
(D) the further combination therewith of:
(1) a hook, pivotably mounted to depend from the lower longitudinal parallel bar in the set and engageable, in extended position, with the lip of the truck bed wall to limit the vertical movement of the lower bar.

References Cited

UNITED STATES PATENTS

| | | | |
|---|---|---|---|
| 2,754,769 | 7/1956 | Yorston | 105—382 |
| 3,048,438 | 8/1962 | Koch | 296—27 |
| 2,751,248 | 6/1956 | Kritser | 296—12 |
| 1,311,429 | 7/1919 | Weir | 296—10 |
| 3,365,230 | 1/1968 | Langdon | 296—3 |

PHILIP GOODMAN, Primary Examiner

U.S. Cl. X.R.

105—387; 296—43